Feb. 6, 1940.   G. A. LONG   2,189,427
VALVE MECHANISM
Filed July 11, 1938
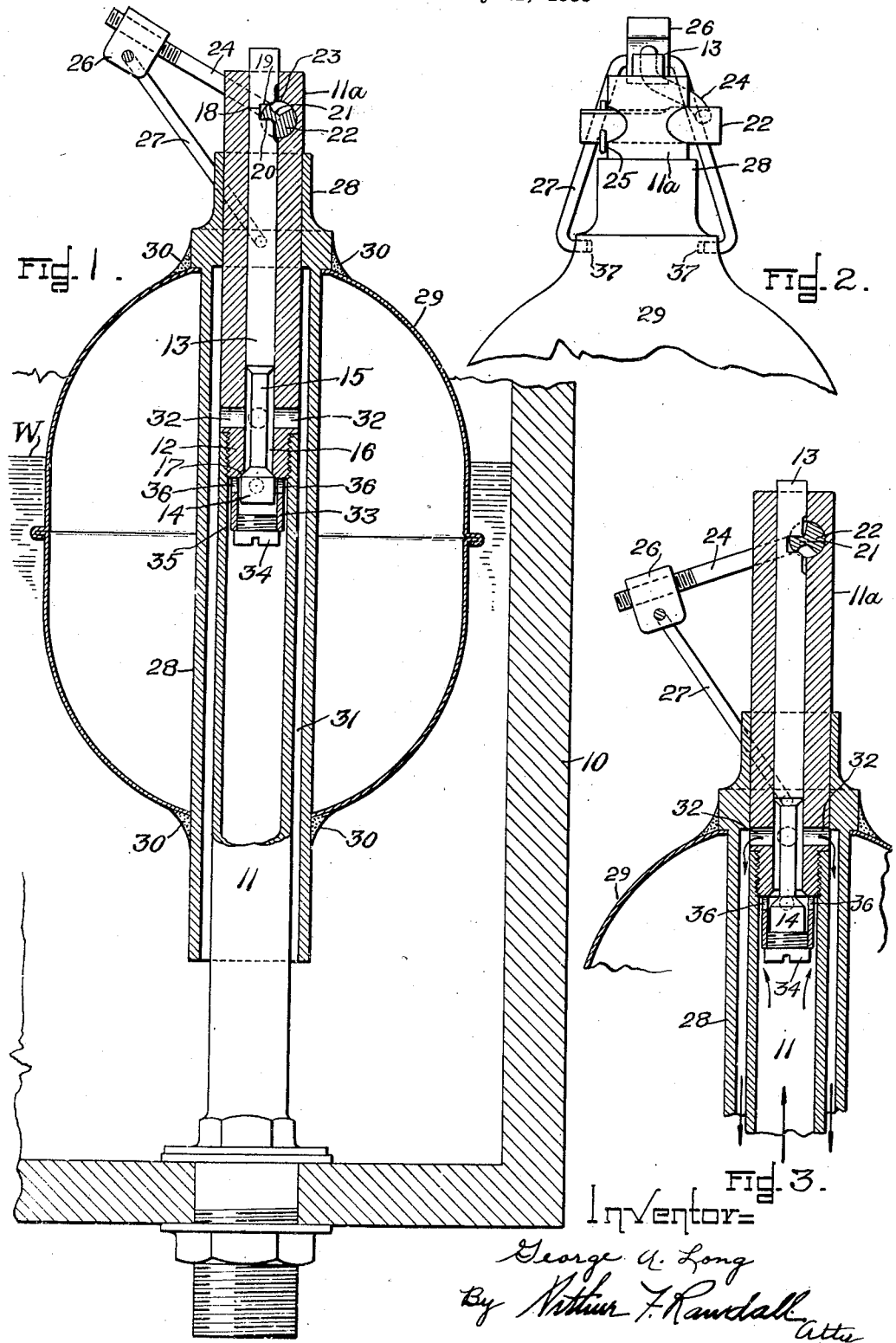
Inventor=
George A. Long
By Arthur F. Randall
Atty Patented Feb. 6, 1940

2,189,427

UNITED STATES PATENT OFFICE 2,189,427

VALVE MECHANISM

George A. Long, Boston, Mass.

Application July 11, 1938, Serial No. 218,493

4 Claims. (Cl. 137—104)

This invention relates to valve mechanisms and more especially to improvements in valve mechanisms for toilet flushing tanks.

The object of the invention is to provide an improved valve mechanism of the class described which will be of simple, efficient and compact construction and which will automatically control the supply of water to a tank or other reservoir so as to maintain a supply of water therein at a predetermined level.

To these ends I have provided an improved valve mechanism having the construction and mode of operation set forth in the following description, the several novel features of the invention being separately pointed out and defined in the claims at the close thereof.

In the accompanying drawing—

Fig. 1 is a vertical sectional view of a toilet flushing tank provided with my improved valve mechanism.

Fig. 2 is a side elevation of the upper portion of the valve mechanism shown in Fig. 1.

Fig. 3 is a vertical sectional view of the upper portion of the valve mechanism shown in Fig. 1 with the valve of said mechanism in its open position.

In the embodiment of my invention illustrated in the drawing 10 represents a tank which, as usual, may be provided at its bottom with a valve controlled outlet which is not shown in the drawing but which is connected with the toilet fixture that is to be flushed.

A vertical stand pipe 11 extends through an aperture formed in the bottom wall of tank 10 and at its upper end is provided with a tubular extension 11a. At its lower end the extension 11a is reduced in diameter, as at 12, and exteriorly threaded, said threaded portion being screwed tightly into the upper end of the stand pipe 11 which is interiorly threaded to receive it. Within the tubular extension 11a is slidably mounted the stem 13 of a conical valve 14, said valve being connected with said stem by a neck 15 of reduced diameter so as to provide a conduit or port 16 at the lower end of which is provided a conical seat 17 for the valve 14.

Adjacent to its upper end and at one side thereof the stem 13 is made with a rectangular notch 18 which provides opposed spaced-apart shoulders 19 and 20. Within the notch 18 and cooperating with the shoulders 19 and 20 thereof is a radial tooth 21 formed upon an otherwise cylindrical plug 22 which is rotatably mounted within a hole 23 formed transversely through the upper end portion of the extension 11a at right angles with the axis of stem 13.

At its one end the plug 22 is provided with a radial arm 24 while the opposite end of said plug is formed with a transverse aperture to receive a cotter pin or the like 25. As will be clear, this cotter pin and the arm 24 prevent any substantial endwise displacement of the plug 22.

The outer end portion of the arm 24 is threaded, as shown in Figs. 1 and 3, and onto this threaded portion is screwed a small block 26. This block is formed with two holes extending therethrough one of which is threaded to receive the arm 24 and the other of which is occupied by the middle portion of a bail-shaped link 27 by which said block 26 is connected with a sleeve 28 that is slidably mounted upon the extension 11a.

The sleeve 28 extends downwardly through a spheroidal sheet metal shell 29 to which it is fastened by solder or otherwise as at 30 so as to provide a hermetically sealed air space within said shell. Thus the sleeve 28 and shell 29 constitute a float element that is slidable up and down on the fixed standpipe 11—11a and when thus moved said element acts through link 27 and arm 24 to rotatively adjust plug 22 and the tooth 21 of the latter serves to shift the valve 13—14—15 endwise.

As shown, the interior diameter of the upper end portion of sleeve 28 is such as to slidably fit the standpipe 11—11a while the interior diameter of the lower portion of said sleeve is greater than the outside diameter of said standpipe so as to provide a water delivery conduit 31 between the two that is open at its lower end. Adjacent to its lower end the standpipe extension 11a is formed with four radial ports 32 whose inner ends communicate with the port 16 and whose outer ends communicate with conduit 31.

The lower end of the tubular standpipe extension 11a projects below the valve seat 17 in the form of a nipple 33 whose lower end is interiorly threaded to receive within it an exteriorly threaded closure plug 34. This plug may, as shown in Fig. 3, serve as a stop to limit the downward movement of valve 13—14—15 and float 28—29 while the upward movement of the valve and float is limited by the engagement of the valve with seat 17. The plug 34 also serves to prevent the valve from falling downwardly through pipe section 11 should it be necessary to remove the plug 22 while the apparatus is in position within the tank 10.

The outside diameter of the nipple 33 is less than the inside diameter of the standpipe section 11 so that an annular passageway 35 is provided between said nipple and the standpipe section 11 through which water is free to pass from the latter to four radial ports 36 formed through the nipple 33 opposite the conical valve 14.

The lower end of the standpipe section 11 is adapted to be connected with a supply of water under head or pressure and when the float and valve occupy their lowermost positions, as shown in Fig. 3, water flows upwardly through standpipe section 11 to the ports 36 and thence through the ports 16 and 32 into the conduit 31 provided by the sleeve 28. From the ports 32 the water is forced downwardly through the conduit 31 and discharges from the lower end of the latter into the tank 10. As will be clear, the buoyancy of the float 29 will cause it to rise as the water level within the tank 10 rises and this upward movement of the float is assisted by the reaction of the water that is discharged downwardly under pressure through the conduit 31. Therefore, the float 28—29 can be made heavier than would be the case in the absence of this reaction which is an advantage when the float descends by gravity to open the valve 13—14—15 against the head or pressure of the water within the standpipe section 11.

As the water level within tank 10 reaches the point illustrated in Fig. 1 the valve is closed. When the contents of tank 10 are discharged through the usual outlet, not shown, the float 28—29 descends by gravity and acts through the link 27 and arm 24 to rotate the plug 22 in a direction to open the valve. The leverage through which the float operates plug 22 is about ten to one and in practice I have found that a float 28—29 weighing about one pound and with a shell 29 of about the dimensions illustrated in Fig. 1, is sufficient to act through said leverage to open valve 14, which is about five-sixteenths of an inch in diameter, against the usual head or pressure found in water systems.

The opposite ends of the bail-shaped link 27 are sprung into sockets 37, Fig. 2, provided at opposite sides of sleeve 28 and when it is desired to vary or change the effective lengths of the arm 24 the two legs of link 27 may be sprung outwardly so as to disengage them from sleeve 28 whereupon the block 26 is free to be rotated to adjust it on arm 24 toward or from the plug 22. After such adjustment the two legs of the link 27 are re-engaged with the sockets 37.

From the above description it will be clear that I have provided a valve mechanism of the type described which is very compact and does not require very much space laterally. That is, the tank can be made so that its width upon the interior thereof is only slightly greater than the outside diameter of the spheroidal shell 29.

What I claim is:

1. A valve mechanism of the character described comprising a fixedly supported standpipe to which water under head or pressure is supplied, said standpipe being provided upon its interior with a valve seat; a valve within said standpipe cooperating with said seat to control the flow of water through said standpipe; a float surrounding and movably mounted upon said standpipe so as to provide a downwardly directed delivery conduit surrounding said standpipe; a valve-operating member rotatably supported by said standpipe and engaging said valve, and means through which up and down movement of the float on said standpipe acts through said member to operate said valve, said standpipe being made with a port through which water is delivered into said conduit from the interior of said standpipe when said valve is opened by downward movement of said float.

2. A valve mechanism of the character described comprising a fixedly supported standpipe to the lower end of which water under head or pressure is supplied, said standpipe being provided upon its interior with a valve seat; a valve within said standpipe cooperating with said seat to control the flow of water through said standpipe, said valve opening downwardly against the pressure of the water within the standpipe; a float surrounding and movably mounted upon said standpipe so as to provide a delivery conduit therebetween; a valve-operating member rotatably supported by said standpipe above said float and engaging said valve, and means through which up and down movement of the float on said standpipe acts through said member to operate said valve, said standpipe being made with an outlet above said seat through which water is delivered into said conduit from the interior of said standpipe when said valve is opened by downward movement of said float.

3. A valve mechanism of the character described comprising a fixedly supported standpipe to the lower end of which water under head or pressure is supplied, said standpipe being provided upon its interior with a valve seat; a valve disposed axially within said standpipe and cooperating with said seat to control the flow of water through said standpipe, said valve opening downwardly against the pressure of the water within the standpipe and having an upwardly extending stem formed with a notch at one side thereof; a float surrounding and movably mounted upon said standpipe so as to provide a downwardly directed delivery conduit therebetween which is closed at its upper end; a valve-operating member rotatably supported by said standpipe above said float with its axis disposed at right angles to the axis of said valve, said operating member being made with a relatively short radial tooth occupying the notch of said valve stem and also with a relatively long radial arm, and a link connecting the outer end of said arm with said float through which and said arm up and down movement of the float acts to rotate said member thereby to operate said valve, said standpipe being made with an outlet disposed above said seat through which water is delivered into said conduit from the interior of said standpipe when said valve is opened by downward movement of said float.

4. A valve mechanism of the character described constructed in accordance with claim 3 wherein a stop is provided for limiting the opening movement of said valve.

GEORGE A. LONG.